May 18, 1965 C. H. JOLLY 3,183,856
APPARATUS FOR MAKING AND DISPENSING SANDWICHES
Filed Oct. 31, 1961 4 Sheets-Sheet 1

Carl H. Jolly
INVENTOR.

BY Oliver D. Olson
Agent

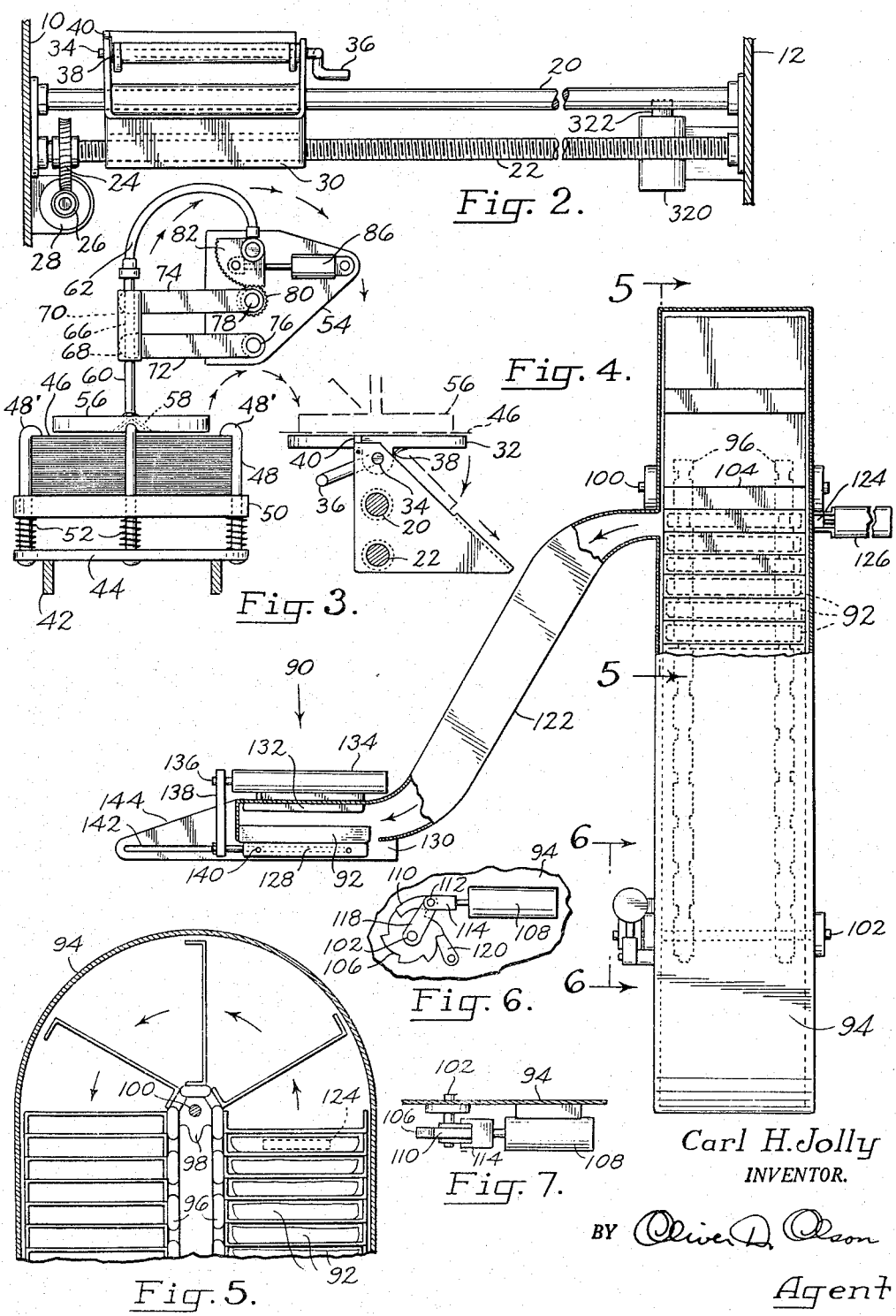

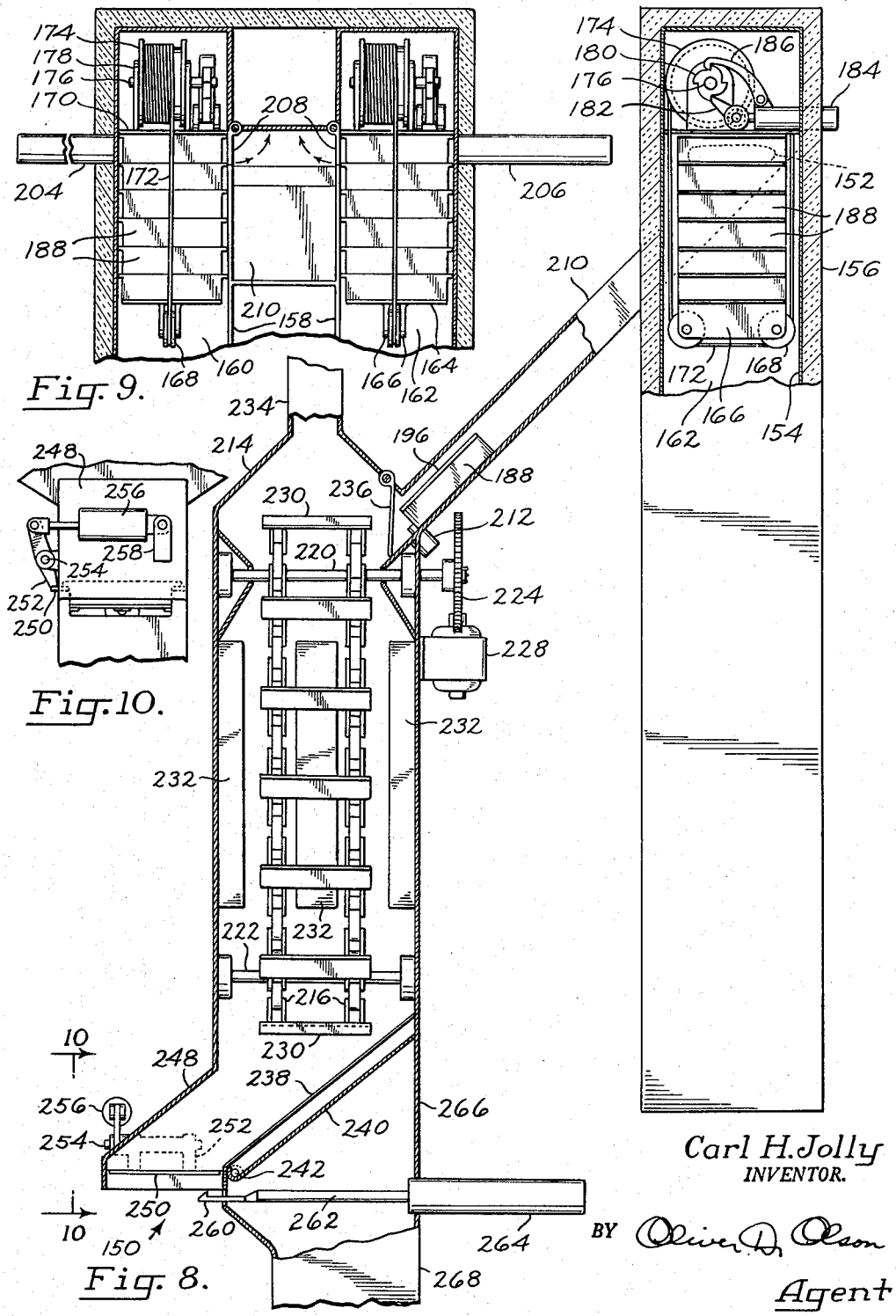

May 18, 1965     C. H. JOLLY     3,183,856
APPARATUS FOR MAKING AND DISPENSING SANDWICHES
Filed Oct. 31, 1961     4 Sheets-Sheet 4
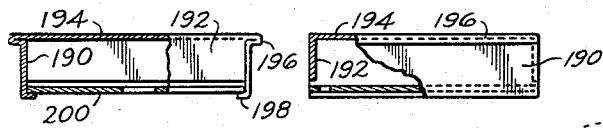
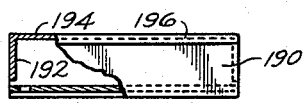
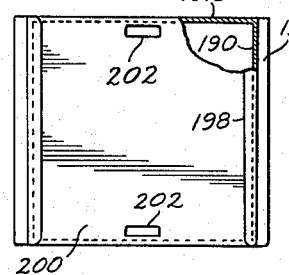
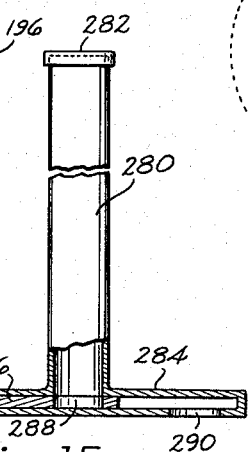
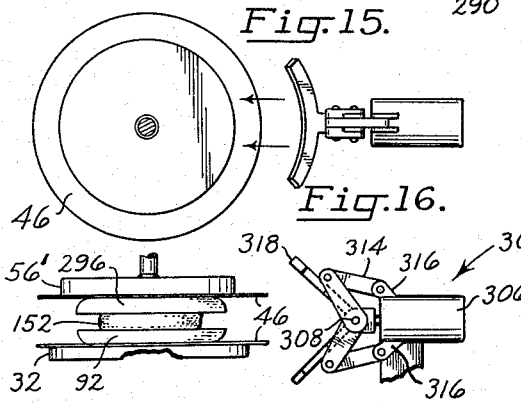
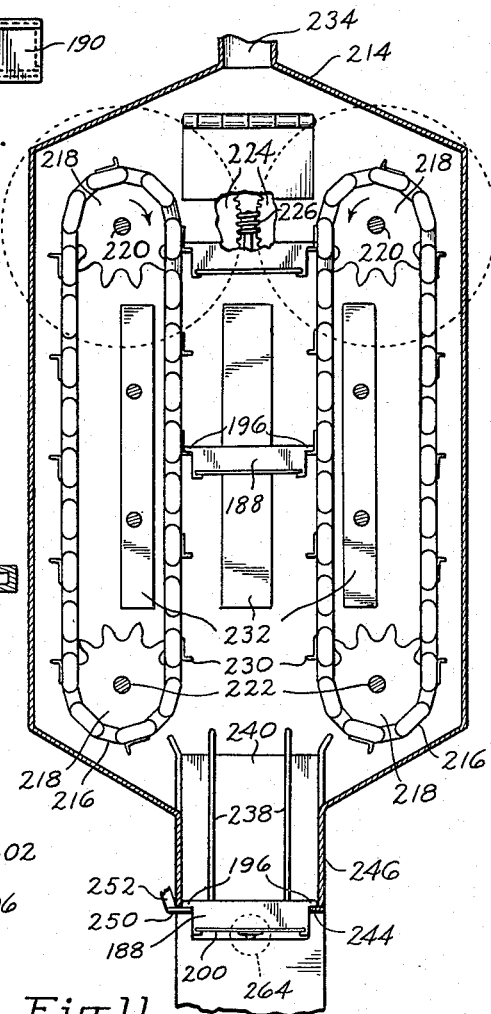
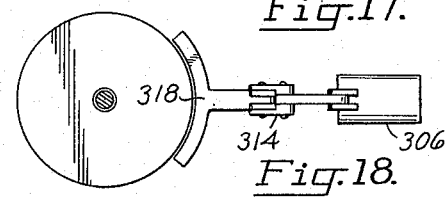
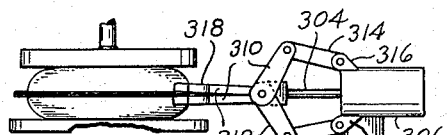
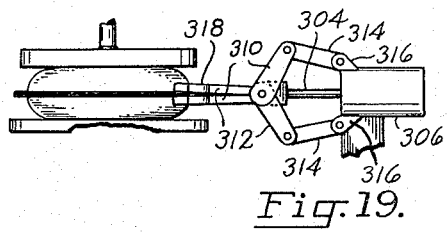
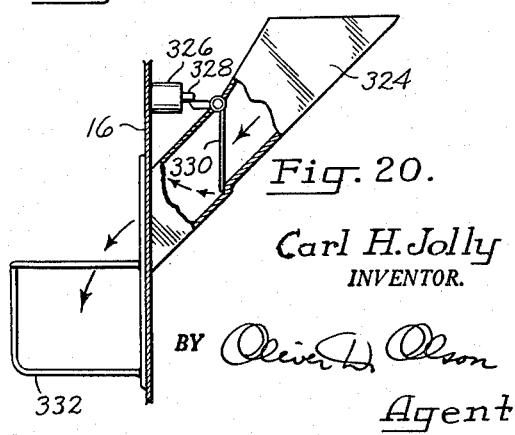
Carl H. Jolly
INVENTOR.
BY Agent

United States Patent Office 3,183,856
Patented May 18, 1965

3,183,856
APPARATUS FOR MAKING AND DISPENSING
SANDWICHES
Carl H. Jolly, 15734 SE. Powell, Portland, Oreg.
Filed Oct. 31, 1961, Ser. No. 149,033
8 Claims. (Cl. 107—1)

This invention relates to dispensing devices, and more particularly to a device for making and dispensing sandwiches.

The principal object of this invention is to provide apparatus by which the separate components of a sandwich are assembled from storage in proper sequence.

Another important object of this invention is the provision of apparatus which, upon the deposit of a coin, automatically assembles the components of a sandwich, wraps the latter and dispenses it to the purchaser.

Still another important object of the present invention is the provision of sandwich making apparatus including means for cooking a component of the sandwich.

A further important object of this invention is the provision of automatic sandwich making and dispensing apparatus which is of simplified construction for economical manufacture and faithful operation with the minimum of maintenance.

The foregoing and other objects and advantages of this invention will appear from the following detailed description, taken in connection with the accompanying drawings in which:

FIG. 2 is a foreshortened vertical section taken along the line 2—2 in FIG. 1 and showing details of the conveyor mechanism;

FIG. 3 is a vertical section taken along the line 3—3 in FIG. 1 and showing details of the wrapper dispensing mechanism;

FIG. 4 is a partially sectioned vertical elevation, taken along the line 4—4 in FIG. 1, and showing the storage, dispensing and heating means for the bottom bread component of the sandwich;

FIG. 5 is a fragmentary sectional view taken along the line 5—5 in FIG. 4 and showing further details of the storage and dispensing mechanism;

FIG. 6 is a fragmentary side elevation, as viewed in the direction of the arrows 6—6 in FIG. 4 and showing details of the step-wise metering control of the storage and dispensing mechanism of FIG. 4;

FIG. 7 is a fragmentary plan view as viewed from the top of FIG. 6;

FIG. 8 is a fragmentary vertical section taken along the line 8—8 in FIG. 1 and showing the mechanism for storing, dispensing and cooking a component of the sandwich.

FIG. 9 is a fragmentary vertical section taken along the line 9—9 in FIG. 1 and showing further details of the storing and dispensing mechanism for alternate choices of a sandwich component to be cooked;

FIG. 10 is a fragmentary vertical elevation as viewed in the direction of the arrows 10—10 in FIG. 8 and showing further details of the mechanism for releasing the patty container after dispensing the cooked component therefrom;

FIG. 11 is a fragmentary vertical section taken along the line 11—11 in FIG. 1 and showing further details of the cooking chamber for the contained meat component;

FIG. 12 is a partially sectioned end elevation showing details of construction of the individual storage container for a meat component of a sandwich;

FIG. 13 is a partially sectioned side elevation of the storage container, as viewed from either right or left in FIG. 12;

FIG. 14 is a partially sectioned bottom view of the container as viewed from the bottom in FIG. 12;

FIG. 15 is a foreshortened vertical section taken along the line 15—15 in FIG. 1 and showing details of mechanism for dispensing a relish or other similar condiment;

FIGS. 16 and 17 are plan and side views, respectively, of a wrapper sealing mechanism of the apparatus, the same being shown in association with a completed sandwich prior to wrapper sealing;

Figure 1:
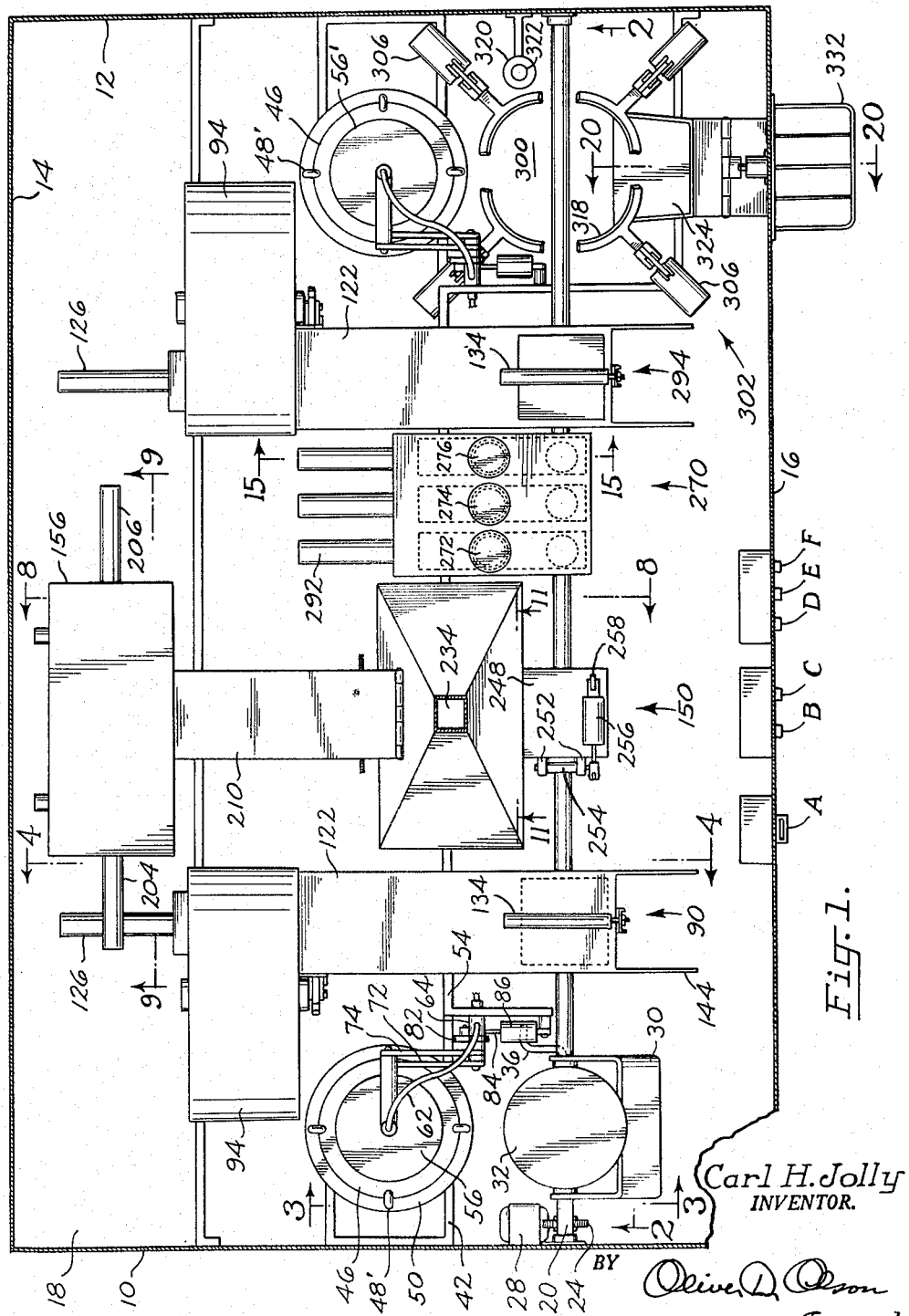
FIG. 1 is a top plan view, with the housing top removed, of a coin operated apparatus for the making and dispensing of sandwiches of the hamburger type.

FIGS. 18 and 19 are plan and side views, respectively, similar to FIGS. 16 and 17, and showing the wrapper sealing mechanism in operative, sealing position; and FIG. 20 is a fragmentary vertical section taken along the line 20—20 in FIG. 1 and showing details of the sandwich dispensing section of the apparatus.

Referring particularly to FIG. 1, the apparatus is confined in a cabinet having side walls 10 and 12, rear wall 14 and front wall 16, a bottom 18 and a top (not shown). Supported at their opposite ends on the side walls are a pair of parallel, vertically spaced rods (FIG. 2), the upper rod 20 being a guide rod and the lower rod 22 being a drive rod. The drive rod is screw threaded throughout its length and is mounted for rotation by the interengaging gears 24, 26 driven by the electric motor 28. A pallet support frame 30 is provided with apertured end plates through which the rods are received, the lower apertures being threaded for cooperation with the drive rod, whereby rotation of the latter causes the pallet frame to traverse the length of the rod. The guide rod serves to stabilize the pallet frame, as will be apparent.

A pallet 32 is mounted pivotally on the pallet frame (FIG. 3) by means of the pivot pin 34 which terminates as one end in a crank section 36. The pallet normally is biased to the horizontal position illustrated in FIG. 3, either by the counterweight effect of the crank section, or by the spring 38 which interengages the pallet and frame. A projection 40 on the pallet abuts the upper end of the frame to support the pallet in horizontal position.

Mounted on the side wall adjacent to the pallet, when the latter is positioned at the starting end of the drive rod, is a bracket 42 which supports the base plate 44 (FIG. 3) of the storage assembly for the bottom wrapper papers 46. The base plate supports a plurality of circumferential spaced up-standing rods 48. These rods are received slidably through appropriately positioned openings in a paper support plate 50, the rods thus functioning to guide the plate through its vertical movement. Coil springs 52 encircle the rods between the base plate and paper support plate, to urge the latter resiliently upward. A supply of bottom wrapper papers 46 is stacked upon the support plate within the confines of the rods, and the upper ends 48' of the latter are turned inward to overlap the upper side of the stack sufficiently to retain the latter.

Mounted on a bracket 54 adjacent the bottom paper supply, is a paper transfer mechanism. This mechanism includes a suction head 56 provided with one or more apertures 58 which communicate with the hollow support rod 60. A length of flexible tubing 62 connects the upper end of this rod to a source of vacuum (not shown), preferably through the automatic valve 64 described hereinafter. A sleeve 66 surrounds an intermediate portion of the hollow rod 60 and is secured thereto. Projecting radially from the sleeve are a pair of vertically spaced parallel pins 68, 70. The outer ends of these pins pivotally support one end of the respective lever arms 72 and 74, and spacer sleeves of different lengths are mounted on the pins to space the lever arms apart horizontally (FIG. 1). The opposite end of the lower lever arm 72 is mounted pivotally on a pin 76 extending from the bracket 54, and the corresponding end of the upper lever arm 74 is secured firmly to a rotary shaft 78 journaled on the bracket. The rotary shaft carries a gear 80 which meshes with the segment gear 82 mounted rotatably on the bracket. The armature 84 of an electric solenoid 86 is connected pivotally to the segment gear, and the solenoid is supported pivotally on the bracket.

Thus, upon deposit of a coin in the coin actuator mechanism A, the solenoid 86 is energized. The connection between mechanism A and solenoid 86 is of conventional construction. As its armature is retracted the segment gear is rotated counterclockwise (FIG. 3), causing the lever arms to rotate clockwise, while maintaining their parallelogram arrangement. The suction head 56 thus is transferred from its position atop the stack of papers 46 to the position overlying the pallet 32.

The automatic valve 64 is connected operatively to the segment gear 82 such that when the gear has rotated to place head 56 in the position shown in FIG. 3, overlying the stack of papers 46, the valve also has been rotated to open the vacuum supply to the head. The vacuum applied through the head is sufficient to cause the top paper of the stack to cling to the head and to be pulled from under the inturned ends 48' of the rods. The paper thus is transferred to the pallet 32, at which time the segment gear 82 will have rotated the valve 64 to the position at which vacuum is released and the paper is deposited upon the pallet.

The pallet 32 now is transferred to the second station 90, by activation of the motor 28, as by a conventional sequence timer switch energized by the coin actuator mechanism A. At this second station the pallet underlies the discharge section (FIG. 4) from which the bottom bread half 92, in the form of a slice or, as shown, a bun half, is dispensed onto the bottom wrapper paper 46 supported on the pallet. These bottom bun halves are stored in a compartment 94 which encloses a continuous conveyor assembly illustrated in FIGS. 4 and 5. The conveyor includes a pair of laterally spaced chains 96 which are trained over top and bottom sprockets 98 carried by the top and bottom shafts 100 and 102, respectively, supported by the compartment. To each laterally aligned link of the chains 96 is secured a conveyor flight 104. As best shown in FIG. 5, each flight comprises a metal plate which is substantially U-shaped in cross section, with the spaced ends extending in the direction of movement of the conveyor chains (indicated by the arrows). Each flight thus serves to store one of the bottom bun halves 92.

The lower sprocket shaft 102 extends outwardly at one end through the compartment wall and supports a ratchet gear 106 (FIG. 6). An electric solenoid 108 is mounted on the wall and its armature carries at its outer end a ratchet driving pawl 110. The pawl preferably is secured to a pin 112 connected pivotally to the pawl head 114 carried by the armature, and a pair of links 116 also are secured at one end to the pin and journaled at their opposite ends freely on the ratchet gear shaft 102. This arrangement insures that the pawl makes firm contact with the ratchet gear by rotation about the ratchet gear axis during extension of the armature. A locking pawl 120 also is mounted pivotally on the compartment wall to secure the ratchet in its stepwise positions of adjustment, as will be apparent.

Thus, upon extension of the armature by operation of the solenoid 108, for example by the momentary closure of a limit switch in the electric circuit of said solenoid 108, as by contact of the switch by the pallet 32, the ratchet is moved an increment of rotation sufficient to advance each conveyor flight 104 a distance of one flight.

Adjacent the upper end of the up-feed side of the conveyor flights there is positioned a discharge chute 122 which communicates at its upper end through an opening in the compartment wall with the adjacent open end of the flights. A registering opening in the opposite wall freely receives the plunger 124 attached to the outer end of the armature of an electric solenoid 126. Thus, as each conveyor flight comes into registry with these openings the solenoid may be actuated, for example by the momentary closure of a limit switch in the electric circuit of said solenoid 126, as by contact of the switch by the pallet 32, to project the plunger through the flight and push the bottom bun half carried thereon into the chute.

The bottom bun half slides by gravity down the chute and onto a retractable plate 128 normally closing the open bottom end of the discharge housing 130. A heater element 132 may be positioned in the housing above the bottom bun half for toasting the inner surface of the latter. The electric circuit of this heater element may be completed by a contact on the aforementioned timer switch.

The foregoing sequence of operations preferably is initiated at such time that the toasted bottom bun half is ready to be deposited upon the paper covered pallet 32 when the latter arrives at the second station. At this time the solenoid 134 is actuated, as by the aforementioned sequence timer switch, to extend its armature 136 which is connected through the link 138 to the retractable plate 128. Laterally extending pins 140 on the plate ride in guide grooves 142 provided in the side walls and side extensions 144 of the discharge housing.

The pallet 32, now supporting the bottom paper and bottom bun half, now progresses to the third station 150 where a patty 152 of meat, or other cooked food, is deposited upon the bun. This movement of the pallet is effected, for example, by the aforementioned timer switch again closing the contact in the electric circuit of the motor 28 for a time sufficient to move the pallet to the third station 150. At this time the timer switch opens said contact to stop the motor. Referring particularly to FIGS. 8 and 9, the meat storage housing 154 is covered with a heat insulating material 156 and is refrigerated in any conventional manner. Spaced interior walls 158 (FIG. 9) divide the housing into two laterally spaced vertically elongated compartments 160 and 162. In each compartment there is contained a conveyor elevator which includes a base plate 164 provided with depending spaced brackets 166 which support the pulleys 168. Adjacent the upper end of each compartment a shelf 170 supports a cable winch. One end of a cable 172 is secured to the winch drum 174, and the uncoiled portion of the cable extends downward and under the pulleys and thence upward along the other side where the end of the cable is secured to the shelf. The winch drum shaft 176 is supported at its opposite ends in the spaced brackets 178, and one end of the shaft carries a ratchet gear 180 which is rotated segmentally by the pawl 182 mounted on the armature of the solenoid 184 controlled by such means as the aforementioned sequence timer switch. This solenoid is activated and deactivated for example by the momentary closure of a timer switch in its electric circuit, as by contact of the switch by the pallet 32. A locking pawl 186 secures the ratchet gear in its stepwise positions of rotation and thus supports the elevator base 164 in its stepwise positions of elevation.

The elevator base supports a stack of containers 188, each of which is constructed in the manner illustrated in FIGS. 12–14. The container is formed with peripheral side walls 190 and end walls 192 and an integral top cover 194 forming laterally projecting flanges 196. The lower ends of the side walls 190 are turned inward to form flanges 198 for supporting the removable bottom 200. The front and rear walls 192 terminate above the bottom 200 to permit removal of the latter. Adjacent the front and rear ends of the bottom are provided the openings 202 by which the bottom is engaged for removal.

The pair of openings are provided for symmetry so that the containers may be stacked with either end forward.

It is intended that the containers in one compartment 160 may contain patties of hamburger, for example, while the containers in the other compartment 162 may contain patties of sandwich steak, hamburger and cheese, or other food.

An opening is provided in the outer wall 154 of each compartment 160, 162 adjacent the upper end of the latter, for receiving freely therethrough the plunger end of the armature of the associated solenoids 204 and 206 respectively. These solenoids have electric circuits including switch contacts completed for example by the aforementioned timer switch. A registering opening also is provided in the inner wall 158 of each compartment, each opening being removably closed by a pivoted door 208. These openings communicate with the upper end of the centrally located discharge chute 210 which projects angularly downward through the housing 154 (FIG. 8). Thus, as one or the other of the solenoids 204, 206 is actuated, as by prior selection of one of the corresponding electric circuit control push buttons B or C on the front panel, the uppermost container 188 in the associated stack is pushed into the chute, wherein it progresses to the lower end, coming to rest against the extended armature of the solenoid 212.

The outfeed end of the chute leads into the upper end of a cooking chamber 214. Within this chamber there is mounted a pair of laterally spaced conveyors (FIGS. 8 and 11) each including a pair of spaced continuous conveyor chains 216 trained over vertically spaced sprockets 218 mounted on the upper and lower shafts 220 and 222, respectively, supported by the chamber walls. The upper shafts 220 are interconnected, for synchronous movement of the chains, by the gears 224 which engage the common worm 226 on the output shaft of the electric drive motor 228.

Secured to registering links of each pair of chains 216, at spaced intervals along the length of the chains, are angle brackets 230 which cooperate in pairs to receive and support the projecting flanges 196 at opposite sides of the container top 194, thus carrying the container 188 downward toward the bottom end of the cooking chamber. A switch in the electric circuit (not shown) of the solenoid 212 is controlled by the conveyor system such that its armature is retracted to release the container when a pair of conveyor brackets 230 are in position to receive the container.

Heater elements 232, energized in the same manner as heater element 132, are supported within the cooking chamber, preferably on all four sides of the container and in the vertical space between the sprockets 218. The meat patty 152 thus is cooked while in its container 188 as the latter progresses downward through the chamber. Smoke and other cooking gases are exhausted through the chimney 234 at the top of the cooking chamber, and these gases are prevented from entering the chute 210 by means of the baffle 236 which is pivotally mounted across the discharge opening of the chute. Grease drippings from the cooking meat fall by gravity through the openings in the incline grid 238 and are collected in the underlying tray 240 and conveyed by a tube 242 to a collection pan (not shown).

As the meat container 188 reaches the lower end of travel of the conveyor chains the supporting pair of angle brackets 230 rotate outward away from each other and release the container, whereupon the latter slides down the incline grid 238 to the discharge outlet. Here, the projecting flanges 196 on the container rest upon the inturned end 244 of the wall 246 of the discharge housing 248 and upon the inwardly projecting plate 250 which is supported retractably by the lever arms 252 secured pivotally intermediate their ends on the pivot pin 254. The outer ends of the lever arms are connected pivotally to the armature of the solenoid 256 supported pivotally by the upstanding bracket 258 mounted on the discharge housing and actuated by such means as a limit switch in the electric circuit of the solenoid 256, as by contact of the switch by the pallet 32.

When the container is supported in the discharge opening, one of the apertures 202 in the bottom plate 200 receives the hook end 260 of the armature 262 of solenoid 264 which is supported by the downward extension 266 of the cooking chamber side wall and which is actuated by such means as the aforementioned sequence timer switch or by a switch operated by the container.

When the pallet 32 reaches the third station 150 underlying the container 188, the solenoid 264 is actuated to retract its armature, whereupon the hook 260 withdraws the retractable bottom 200 of the container and deposits the cooked meat patty 152 upon the toasted surface of the bottom bun half 92. The retracted bottom 200 is drawn by the hook into the receptacle 268, where the bottoms are periodically collected for cleaning. After the pallet has moved from the third station in the direction of the fourth station, the solenoid 256 is actuated to retract the plate 250 and thus release the container 188 which falls by gravity into a collection receptacle (not shown) for periodic removal and cleansing.

The pallet 32 now progresses to the fourth station 270 by appropriate activation of motor 28, as by the aforementioned timer switch again closing the contact in the electric circuit of motor 28, at which one or more condiments may be deposited upon the cooked patty 152. In the embodiment illustrated in FIG. 1 there are three dispensers 272, 274 and 276, providing a choice of three condiments, for example relish, onion, catsup. One or more of these is selected by the purchaser by depressing the desired push buttons D, E and F, and those chosen will be deposited in succession as the pallet progresses by them. Each of the condiment dispensers (FIG. 15) includes an upstanding container 280 provided with a removable top 282 for filling. The open bottom end of the container is secured to a horizontally disposed hollow flat cylinder 284, and an opening in the latter registers with the container opening. Mounted slidably within the cylinder is a piston 286 provided with an aperture 288 which, in the retracted position of the piston, registers with the open end of the container. The piston aperture thus may be filled with the condiment as the latter feeds by gravity into it. Adjacent the forward end of the feed cylinder is an aperture 290 in the bottom wall corresponding in dimension with the aperture in the piston.

The piston is connected to the armature of an electric solenoid 292 which, upon activation, by the previous closure of the selector switch in its electric circuit, controlled by the appropriate push-button D, E, or F, and then by the momentary closure of an operating switch in its electric circuit, by contact of said switch by the pallet moves the piston forward for registry of the openings 288 and 290 and consequent discharge of the quantity of the condiment carried in the piston opening. During this forward movement the section of the piston behind its opening effectively seals the bottom end of the condiment container. Upon deactivation of the solenoid, a spring (not shown) retracts the piston to the position illustrated, where its opening is again filled with the condiment, preparatory to the next dispensing operation.

Having deposited the selected condiments on the patty, the pallet 32 proceeds to the fifth station 294, by appropriate activation of motor 28, as by the aforementioned timer switch again closing the contact in the electric circuit of motor 28, where the top bun half 296 (FIG. 16) is deposited upon the condiment-covered patty 152. The storage and dispensing assembly for this top bun half is substantially the same as for the bottom bun half described hereinbefore. It will be understood, of course, that the top bun halves are stored on conveyor flights similar to the conveyor flights 104 with their top sides up. Additionally, a heater similar to the heater element 132 shown in FIG. 4 is incorporated in a retractable plate similar to the retractable base 128, in order for the inner surface of the top half to be toasted.

The sandwich thus having been completed, the pallet 32 now progresses to the six and final station 300, by appropriate activation of motor 28, as by the aforementioned timer switch again closing the contact in the electric circuit of motor 28, for wrapping and dispensing. First, a top wrapping paper 46 is deposited over the top half of the bun by means of a second paper storage and transfer assembly identical to that described hereinbefore. Then, when the suction head 56′ still presses downward on the sandwich (FIGS. 17 and 19) package sealing means is operated to seal together the peripheral edges of the bottom and top wrapping papers.

In the embodiment illustrated in FIG. 1 there are four heat sealing devices 302, the construction of which is best illustrated in FIGS. 17 and 19. The projecting end of the armature 304 of an electric solenoid 306, controlled by such means as the aforementioned sequence timer switch, supports a transverse pin 308 which pivotally mounts a pair of opposed angular jaw members 310 and 312 intermediate their respective ends. One end of each jaw is pivotally connected by a link 314 to a bracket 316 carried by the solenoid 306. The opposite, projecting end of each jaw member is provided with a heat sealing tip 318. The tip is heated by such means as a resistance wire contained within it and connected to a suitable source of electric supply (not shown).

Since it is desirable that the package be sealed substantially completely about its periphery, the heating tips 318 of each of the four units shown in FIG. 1 are curved arcuately so that, upon extension of the armature (FIG. 19) to close the jaws, the heating tips are moved inward to substantially complete a circle. In so doing, each pair of jaws draws the top and bottom wrapping papers 46 together into tight engagement and heat seals them together.

The heat sealing jaws then are retracted, the suction head 56′ withdrawn, and the solenoid 320 (FIG. 1) energized, as by the aforementioned sequence timer switch, to project its armature 322 (FIG. 2) upward into engagement with the crank extension 36 of the pallet supporting pin 34. The pallet 32 thus is pivoted clockwise (FIG. 3), whereupon the wrapped sandwich slides from it and into the dispensing chute 324 (FIG. 20). The locking solenoid 326 then is energized, as by the aforementioned sequence timer switch, retracting its armature 328 and releasing the safety gate 330 whereupon the sandwich slides through the chute and is deposited in the basket 332 on the outer side of the front wall 16 of the cabinet. The drive motor 28 now is reversed, as by the aforementioned sequence timer switch, to return the pallet 32 to the starting position shown in FIG. 1.

It will be apparent that various means may be employed to time the sequence of operations described hereinbefore. For example, the deposit of a coin may function to actuate a timer for the proper sequential operation of certain components, such as the heaters and conveyors while the travelling pallet may serve to actuate the various mechanisms which function to deposit the sandwich components on the pallet, upon arrival of the pallet at the various stations.

The sandwich making apparatus also may be employed to make sandwiches in which the sandwich food need not be heated or cooked. Thus, the patties described hereinbefore may be replaced by slices of cheese, ham, chicken, or other food. In this case the cooking chamber may be omitted and the sandwich food dispensed directly from the storage conveyor to the discharge station 150.

The foregoing and other modifications and changes in the structural details described hereinbefore, may be made without departing from the spirit of this invention and the scope of the appended claims.

Having now described my invention and the manner in which it may be used, what I claim as new and desire to secure by Letters Patent is:

1. Sandwich making apparatus, comprising a horizontal sandwich support mounted for reciprocation between a start position and an end position, bottom bread half storage means, dispenser means communicating with the bottom bread half storage means and having a discharge end positioned adjacent the reciprocation path of the support, the dispenser means being operable when the support is moved from its start position to a position adjacent the discharge end of the bottom bread half dispenser to remove from said storage means and dispense a bottom bread half flatwise on the support, sandwich food storage means, dispenser means communicating with the food storage means and having a discharge end positioned adjacent the reciprocation path of the support and spaced from the first named discharge end in the direction toward the end position of reciprocation of the support, the food dispenser means being operable when the support is moved from its position adjacent the discharge end of the bottom bread half dispenser to a position adjacent the discharge end of the food dispenser to dispense the food onto the bottom bread half previously deposited on the support, top bread half storage means, dispenser means communicating with the top bread half storage means and having a discharge end positioned adjacent the reciprocation path of the support and spaced from the second named discharge end in the direction toward the end position of reciprocation of the support, the last named dispenser means being operable when the support is moved from its position adjacent the discharge end of the food dispenser to a position adjacent the discharge end of the top bread half dispenser to remove from said storage means and dispense a top bread half over the sandwich food previously deposited onto the bottom bread half.

2. The apparatus of claim 1 including condiment storage means having a discharge end located between the food dispenser means and the top bread half dispenser means, and dispenser means at the discharge end of said condiment storage means and operable when the support is adjacent thereto to dispense condiment on the sandwich food.

3. The apparatus of claim 1 including bottom wrapper paper storage means, transfer means for transferring a bottom wrapper paper from the storage means to the support when the latter is in a position of reciprocation preceding its position for the dispensing of the bottom bread half, top wrapper paper storage means, transfer means for transferring a top wrapper paper from the storage means to the top bread half after the latter has been dispensed onto the sandwich food, and wapper paper sealing means arranged to seal together the periphery of the bottom and top wrapper papers.

4. The apparatus of claim 3 wherein the bottom and top wrapper paper transfer means each comprises a suction head, means mounting the suction head for movement between the paper storage means and the support, a vacuum supply, valve means interconnecting the vacuum supply and the suction head, and valve control means operatively connected to the suction head mounting means for applying vacuum to the suction head during movement of the latter to the support and for releasing the vacuum from the suction head upon arrival of the latter at the support.

5. The apparatus of claim 3 wherein the paper sealing means comprises a plurality of circumferentialy spaced sealing units each comprising a reciprocating drive member supporting a pair of retractable heater jaws adapted to grip between them a portion of the periphery of the bottom and top wrapper paper.

6. The apparatus of claim 3 wherein the support is mounted for movement to positions adjacent each of said paper storage means and paper sealing means.

7. The apparatus of claim 3 including dispenser means adjacent the support carrying the wrapped sandwich for dispensing the latter from the apparatus.

8. Sandwich making and dispensing apparatus, comprising a sandwich support, bottom wrapper paper storage means, transfer means for transferring a bottom wrapper paper from the storage means to the support, bottom bread half storage means, dispenser means communicating with the bottom bread half storage means and having a discharge end, the dispenser means being operable when the support is adjacent the discharge end to dispense a bottom bread half on the bottom wrapper paper on the support, heater means associated with the dispenser means for heating the bottom bread half prior to dispensing the latter, sandwich food storage means, a dispenser means communicating with the food storage means and having a discharge end, the sandwich food dispenser means including heater means for cooking said food prior to dispensing the latter, the sandwich food dispenser means being operable when the support is adjacent its discharge end to dispense the cooked food on the bottom bread half, condiment storage means having a discharge end, dispenser means at said discharge end and operable when the support is adjacent thereto to dispense condiment on the sandwich food, top bread half storage means, dispenser means communicating with the top bread half storage means and having a discharge end, the dispenser means being operable when the support is adjacent the discharge end to dispense a top bread half on the sandwich food, heater means associated with the dispenser means for heating the top bread half prior to dispensing the latter, top wrapper paper storage means, transfer means for transferring a top wrapper paper from the storage means to the top bread half, wrapper paper sealing means arranged to seal together the periphery of the bottom and top wrapper papers, means mounting the support for a movement to positions adjacent each of said discharge ends, paper storage means and paper sealing means, and dispenser means adjacent the support carrying the wrapped sandwich for dispensing the latter from the apparatus.

References Cited by the Examiner
UNITED STATES PATENTS

| | | | |
|---|---|---|---|
| 1,716,226 | 6/29 | Flamm | 107—1.6 |
| 2,337,117 | 12/43 | Lloyd | 107—1.6 |
| 2,626,575 | 1/53 | Whitsel | 107—1.6 |

WILLIAM B. PENN, *Primary Examiner.*

J. D. SEERS, CHARLES A. WILLMUTH, ROBERT E. PULFREY, *Examiners.*